US012762616B2

(12) United States Patent
Mohite et al.

(10) Patent No.: US 12,762,616 B2
(45) Date of Patent: Oct. 13, 2026

(54) ESTIMATING FLEXIBLE CREDIT ELIGIBILITY AND DISBURSEMENT SCHEDULE USING NON-FUNGIBLE TOKENS (NFTs) OF AGRICULTURAL ASSETS

(71) Applicant: Tata Consultancy Services Limited, Mumbai (IN)

(72) Inventors: Jayantrao Mohite, Thane (IN); Dineshkumar Singh, Thane (IN); Suryakant Ashok Sawant, Pune (IN); Vaibhav Sadashiv Lonkar, Pune (IN); Salim Hamsa, Kochi (IN); Harshal Jain, Indore (IN); Ravinkumar Sivalingam, Chennai (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 18/659,074

(22) Filed: May 9, 2024

(65) Prior Publication Data

US 2024/0403953 A1 Dec. 5, 2024

(30) Foreign Application Priority Data

May 30, 2023 (IN) ............................ 202321037342

(51) Int. Cl.
*G06Q 40/03* (2023.01)
*G06Q 50/02* (2024.01)

(52) U.S. Cl.
CPC ............. *G06Q 40/03* (2023.01); *G06Q 50/02* (2013.01); *G06Q 2220/00* (2013.01)

(58) Field of Classification Search
None
See application file for complete search history.

(56) References Cited

U.S. PATENT DOCUMENTS 11,567,478 B2 * 1/2023 Cella .................. G06Q 30/0208
12,164,537 B1 * 12/2024 James Lewis ............ H04L 9/50
2022/0391868 A1 * 12/2022 Jaeger .................... G06Q 30/06

FOREIGN PATENT DOCUMENTS

WO WO-2023243784 A1 * 12/2023 ............ G06F 21/64

OTHER PUBLICATIONS

Malvern Chinaka, Blockchain technology—applications in improving financial inclusion in developing economies. Case study for small scale agriculture in Africa, 2016, https://dspace.mit.edu/bitstream/handle/1721.1/104542/958426765-MIT.pdf.

(Continued)

*Primary Examiner* — Gregory S Cunningham, II
(74) *Attorney, Agent, or Firm* — Finnegan, Henderson, Farabow, Garrett & Dunner, LLP

(57) ABSTRACT

Providing the right mechanism to apply blockchain technology with flexible or dynamic credit disbursement while also addressing valuation of the agricultural assets that are dynamic in nature is required. A method and a system for estimating flexible credit eligibility and disbursement schedule using NFTs of agricultural assets is disclosed. A detailed blockchain based approach is provided for evaluating credit collateral of the NFTs representing the agricultural assets, also interchangeably referred to as physical farm assets or agri-assets. Valuation of the credit eligibility is based on flexibility provided to the farmer on deciding the farm assets to be used, current status of the farmer selected agricultural assets and credit equivalent value of the each of NFTed asset selected by the farmer for the season/year. The dynamic disbursement schedule is based on the personalized or customized parameters associated with the current status of farm and farm assets linked to the credit collateral.

18 Claims, 4 Drawing Sheets

(56) References Cited

OTHER PUBLICATIONS

Christopher N. Ekong et al., “Matching Credit with Season: An Issue for Non Performing Agricultural Loans in Nigeria”, 2013, https://mpra.ub.uni-muenchen.de/88306/1/MPRA_paper_88306.pdf.

* cited by examiner

ESTIMATING FLEXIBLE CREDIT ELIGIBILITY AND DISBURSEMENT SCHEDULE USING NON-FUNGIBLE TOKENS (NFTs) OF AGRICULTURAL ASSETS

PRIORITY CLAIM

This U.S. patent application claims priority under 35 U.S.C. § 119 to: Indian patent application No. 202321037342, filed May 30, 2023. The entire contents of the aforementioned application are incorporated herein by reference.

TECHNICAL FIELD

The embodiments herein generally relate to the field of evaluating credit eligibility based on collaterals and, more particularly, to a method and system for estimating flexible credit eligibility and disbursement schedule using Non-fungible tokens (NFTs) of agricultural assets.

BACKGROUND

Blockchain is explored for applications across domains. Digitization of physical assets through concepts such as Non-fungible tokens (NFTs), which are assets that have been tokenized via the blockchain is also well known. NFTs are assigned unique identification codes called tokens and metadata that distinguish them from other tokens in the blockchain. This tokenization can be done for entities like arts, real-estate such as house, cropland, and can only have one official owner at a time. NFTs can be traded i.e., ownership rights are transferred and exchanged for money in the secondary market. They are used in various transactions, including buying, and selling, borrowing, and lending and exchange transactions. A fractional NFT (non-fungible token) is a single NFT that's been divided into smaller pieces, allowing multiple investors to gain partial ownership of it.

Attempts have been explored for using NFTs to represent agricultural assets or the physical farm assets such as cropland and livestock. Works in literature discuss the potential use of blockchain-based solutions to address issues such as access to credit, transparency in transactions, and the creation of secure and reliable payment systems by representing cropland or agri-land as NFTs. Livestock associated NFTs are being used to track the animal parameters or health etc. However, there are many assets which the farmer owns, such as tractors, farm implements, wells etc., which could be NFTed and utilized for various applications. With blockchain technology, the agricultural assets in the form of NFTs are used as collaterals. An existing approach focusses on transfer of entire NFTs associated with agricultural assets to the lending entity such as banks and is independent of the amount of credit provided to the farmer or utilized by the farmers. Thus, the relation between the number of NFTs transferred and the quantum of credit disbursed to the farmers is not looked into. In addition to this, the right valuation of agricultural assets with cropland and non-cropland assets is technically challenging to be automated since the status or conditions vary with season or time.

Another challenge while working with the NFTs associated with agricultural assets is the credit disbursal. Step wise credit disbursal is well known in banking domain. Season based credit disbursal is also discussed in standard lending mechanism. However, the technical challenge lies in providing the right mechanism to apply blockchain technology with flexible or dynamic credit disbursement while also addressing valuation of the agricultural assets that are dynamic in nature.

SUMMARY

Embodiments of the present disclosure present technological improvements as solutions to one or more of the above-mentioned technical problems recognized by the inventors in conventional systems.

For example, in one embodiment, a method for estimating flexible credit eligibility and disbursement schedule using Non-fungible tokens (NFTs) of agricultural assets or the physical farm assets is provided. The method validating and creating a plurality of digital farm assets for a plurality of physical farm assets registered by a farmer or a farmer representative, wherein the plurality of physical farm assets comprises at least one cropland. Further, the method includes sourcing and recording a farm asset metadata associated with each of the physical farm assets, wherein the metadata is used by the NFT wallet and exchange server during creation of a plurality of Non-Fungible Tokens (NFTs) associated with the plurality of digital farm assets. The plurality of NFTs represent collaterals available with the farmer. Furthermore, the method includes receiving a request for valuation of a set of NFTs selected by the farmer or the farmer representative from among the plurality NFTs for estimating Credit Eligibility (CE) of the farmer for a credit request initiated by the farmer or the farmer representative. Further, the method includes validating ownership of the set of NFTs that are registered in a farmer wallet available in the NFT wallet and an exchange server. Furthermore, the method includes estimating the CE of the farmer in accordance with the set of NFTs in the farmer wallet in terms of i) Credit Equivalent Value (CEV) cropland associated with at least one cropland based physical farm asset within the set of NFTs, and ii) one or more physical farm asset other than the cropland (CEV non-cropland). Further, the method includes issuing a sanction of a loan amount from a lending entity for the credit request in accordance with the estimated CE to initiate a credit disbursal via a dynamic disbursement schedule, wherein full or fraction of NFTs to be transferred from the farmer wallet to a loan wallet are proportionate to the amount of the credit disbursal.

The dynamic disbursement schedule firstly generates an initial disbursement schedule based on a current status of the set of the digital farm assets derived from real-time data associated with at least one crop planned by the farmer for the at least one cropland, soil quality of the at least one cropland, forecasted weather in geography of the at least one cropland and personalized package of practices generated for the farmer, wherein the real time data is sourced from at least one of on-field sensors, satellite data and external data sources. Secondly, dynamically alters the initial disbursement schedule based on one of: real-time prediction or detection of events or change in state of the crop occurred post generating the initial disbursement schedule, wherein the events or change in state of the crop is determined based on the real time data; and a real time request supported by an event information from the farmer or the farmer representative for an additional credit disbursal, wherein the event information is validated based on the real time data or supported by authorized field survey.

In another aspect, a system for estimating flexible credit eligibility and disbursement schedule using Non-fungible tokens (NFTs) of agricultural assets or the physical farm assets is provided. The system comprises a memory storing instructions; one or more Input/Output (I/O) interfaces; and one or more hardware processors coupled to the memory via the one or more I/O interfaces, wherein the one or more hardware processors are configured by the instructions to validate and create a plurality of digital farm assets for a plurality of physical farm assets registered by a farmer or a farmer representative, wherein the plurality of physical farm assets comprises at least one cropland. Further, the one or more hardware processors are configured to source and record a farm asset metadata associated with each of the physical farm assets, wherein the farm asset metadata is used by the NFT wallet and exchange server during creation of a plurality of Non-Fungible Tokens (NFTs) associated with the plurality of digital farm assets. The plurality of NFTs represent collaterals available with the farmer. Further, the one or more hardware processors are configured to generate a smart contract in a blockchain network defining a plurality of rules and conditions of ownership and transactions associated with the plurality of NFTs for verifying and tracking the ownership and the transactions and a NFT wallet for the farmer. Furthermore, the one or more hardware processors are configured to receive a request for valuation of a set of NFTs selected by the farmer or the farmer representative from among the plurality NFTs for estimating Credit Eligibility (CE) of the farmer for a credit request initiated by the farmer or the farmer representative. Further, the one or more hardware processors are configured to validate ownership of the set of NFTs that are registered in a farmer wallet available in the NFT wallet and an exchange server. Furthermore, the one or more hardware processors are configured to estimate the CE of the farmer in accordance with the set of NFTs in the farmer wallet in terms of i) Credit Equivalent Value (CEV(cropland)) associated with at least one cropland based physical farm asset within the set of NFTs, and ii) one or more physical farm asset other than the cropland (CEV(non-cropland)). Further, the one or more hardware processors are configured to issue a sanction of a loan amount from a lending entity for the credit request in accordance with the estimated CE to initiate a credit disbursal via a dynamic disbursement schedule, wherein full or fraction of NFTs to be transferred from the farmer wallet to a loan wallet are proportionate to the amount of the credit disbursal.

The dynamic disbursement schedule firstly generates an initial disbursement schedule based on a current status of the set of the digital farm assets derived from real-time data associated with at least one crop planned by the farmer for the at least one cropland, soil quality of the at least one cropland, forecasted weather in geography of the at least one cropland and personalized package of practices generated for the farmer, wherein the real time data is sourced from at least one of on-field sensors, satellite data and external data sources. Secondly, dynamically alters the initial disbursement schedule based on one of: real-time prediction or detection of events or change in state of the crop occurred post generating the initial disbursement schedule, wherein the events or change in state of the crop is determined based on the real time data; and a real time request supported by an event information from the farmer or the farmer representative for an additional credit disbursal, wherein the event information is validated based on the real time data or supported by authorized field survey.

In yet another aspect, there are provided one or more non-transitory machine-readable information storage mediums comprising one or more instructions, which when executed by one or more hardware processors causes a method for estimating flexible credit eligibility and disbursement schedule using Non-fungible tokens (NFTs) of agricultural assets or the physical farm assets. The method for/of? validating and creating a plurality of digital farm assets for a plurality of physical farm assets registered by a farmer or a farmer representative, wherein the plurality of physical farm assets comprises at least one cropland. Further, the method includes sourcing and recording a farm asset metadata associated with each of the physical farm assets, wherein the farm asset metadata is used by the NFT wallet and exchange server during creation of a plurality of Non-Fungible Tokens (NFTs) associated with the plurality of digital farm assets. The plurality of NFTs represent collaterals available with the farmer. Further, the method includes generating a smart contract in a blockchain network defining a plurality of rules and conditions of ownership and transactions associated with the plurality of NFTs for verifying and tracking the ownership and the transactions and a NFT wallet for the farmer. Furthermore, the method includes receiving a request for valuation of a set of NFTs selected by the farmer or the farmer representative from among the plurality NFTs for estimating Credit Eligibility (CE) of the farmer for a credit request initiated by the farmer or the farmer representative. Further, the method includes validating ownership of the set of NFTs that are registered in a farmer wallet available in the NFT wallet and an exchange server. Furthermore, the method includes estimating the CE of the farmer in accordance with the set of NFTs in the farmer wallet in terms of i) Credit Equivalent Value (CEV (cropland)) associated with at least one cropland based physical farm asset within the set of NFTs, and ii) one or more physical farm asset other than the cropland (CEV(non-cropland)). Further, the method includes issuing a sanction of a loan amount from a lending entity for the credit request in accordance with the estimated CE to initiate a credit disbursal via a dynamic disbursement schedule, wherein full or fraction of NFTs to be transferred from the farmer wallet to a loan wallet are proportionate to the amount of the credit disbursal.

The dynamic disbursement schedule firstly generates an initial disbursement schedule based on a current status of the set of the digital farm assets derived from real-time data associated with at least one crop planned by the farmer for the at least one cropland, soil quality of the at least one cropland, forecasted weather in geography of the at least one cropland and personalized package of practices generated for the farmer, wherein the real time data is sourced from at least one of on-field sensors, satellite data and external data sources. Secondly, dynamically alters the initial disbursement schedule based on one of: real-time prediction or detection of events or change in state of the crop occurred post generating the initial disbursement schedule, wherein the events or change in state of the crop is determined based on the real time data; and a real time request supported by an event information from the farmer or the farmer representative for an additional credit disbursal, wherein the event information is validated based on the real time data or supported by authorized field survey.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
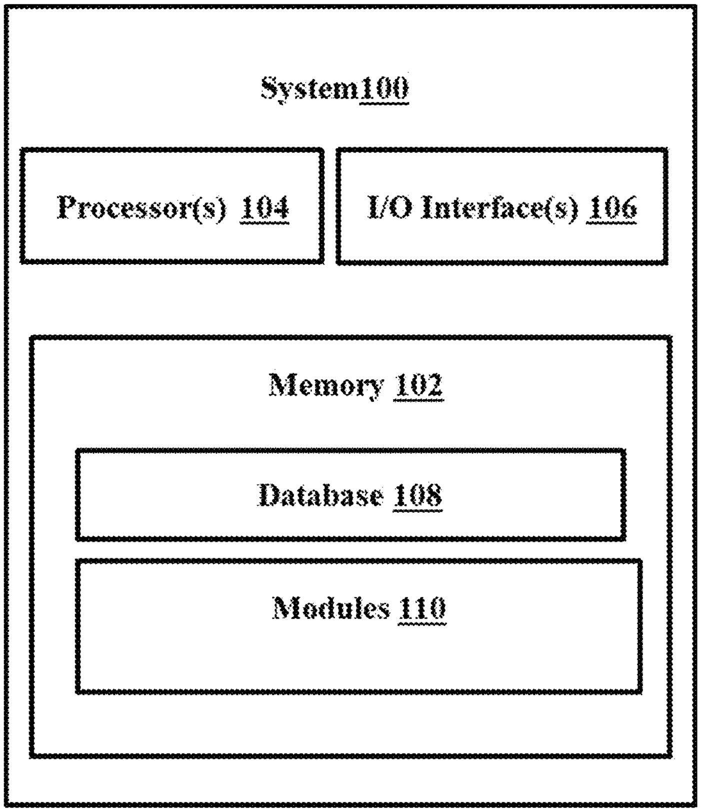
FIG. 1 is a functional block diagram of a system for estimating flexible credit eligibility and disbursement schedule using Non-fungible tokens (NFTs) of agricultural assets, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Technical challenge lies in providing the right mechanism to apply blockchain technology with flexible or dynamic credit disbursement while also addressing valuation of the agricultural assets that are dynamic in nature. Embodiments of the present disclosure provide a method and a system for estimating flexible credit eligibility and disbursement schedule using Non-fungible tokens (NFTs) of agricultural assets. The method disclosed provides a detailed blockchain based approach for evaluating credit collateral of the NFTs representing the agricultural assets, also interchangeably referred to as physical farm assets or agri-assets. The valuation of the credit eligibility is based on flexibility provided to the farmer on deciding the farm assets to be used, current status of the farmer selected agricultural assets and credit equivalent value of the each of NFTed asset selected by the farmer for the season/year. The dynamic disbursement schedule is based on the personalized or customized parameters associated with the current status of a farm and farm assets linked to the credit collateral.

Referring now to the drawings, and more particularly to FIGS. 1 through 3B, where similar reference characters denote corresponding features consistently throughout the figures, there are shown preferred embodiments and these embodiments are described in the context of the following exemplary system and/or method.

FIG. 1 is a functional block diagram of a system for estimating flexible credit eligibility and disbursement schedule using Non-fungible tokens (NFTs) of agricultural assets, in accordance with some embodiments of the present disclosure.

Figure 2:
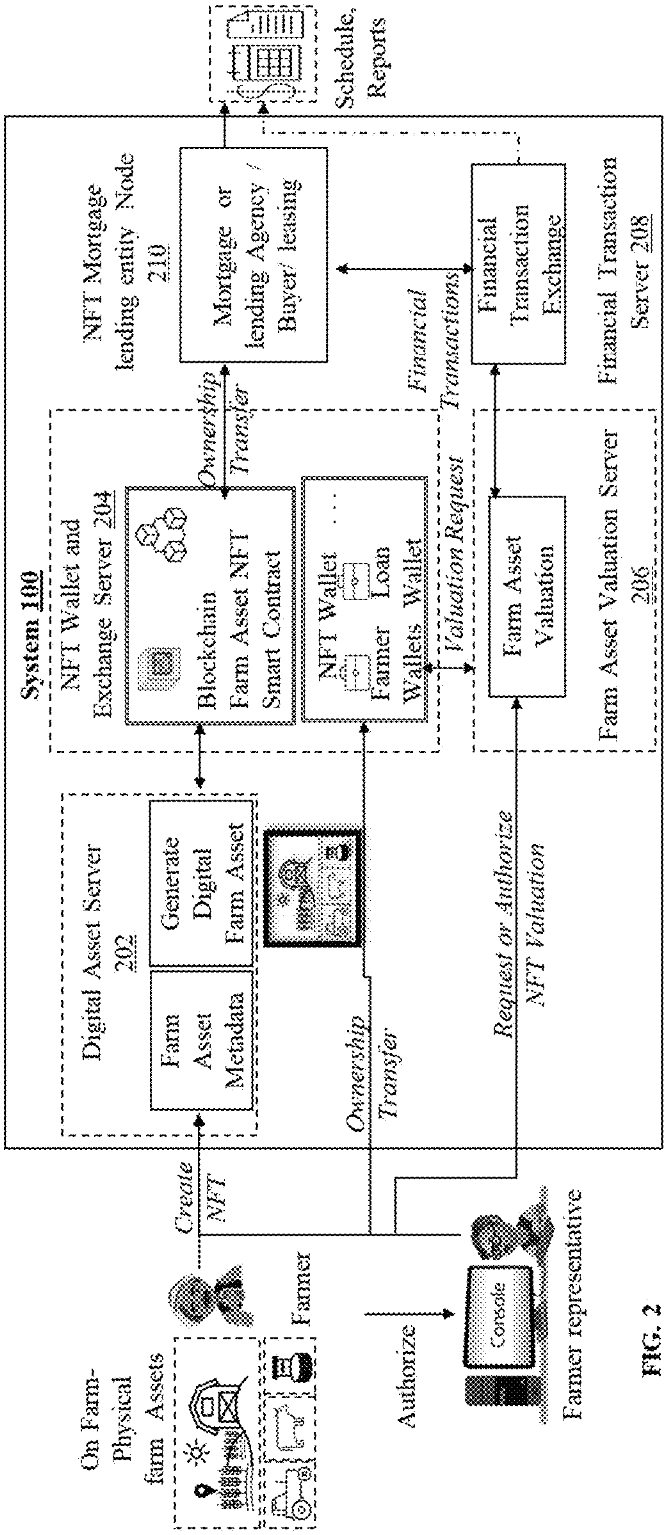
FIG. 2 illustrates an architectural overview of the system of FIG. 1, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. As depicted in FIG. 2, the overall architecture of the system 100 comprises components such as a digital asset server 202, a farm asset, a NFT wallet and exchange server 204, a farm asset valuation server 206, a financial transaction server 208 and an NFT mortgage lending entity node 210, which communicate with each other through the I/O interfaces 106. As well understood for person skilled in the art, the components of the system may be physically distributed within the environment of system 100 and can be implemented in cloud servers of a cloud environment.

The system 100, with one or more hardware processors present across the physically distributed components, is configured to execute functions of one or more functional blocks or components (servers) of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, including, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface(s) 106 can include one or more ports for connecting to a number of external devices or to another server or devices. As depicted in the architecture of system 100 of FIG. 2, the external devices can include a plurality of sensors (which includes satellite sensors, flying or moving sensor, on-field sensors, plant or crop sensors, humans acting as sensors), Global Positioning System (GPS) enabled mobile devices with sensing, processing, communicating, displaying and storage capability, external third party data sources for various types of field level information associated with croplands of the plurality of farmers, external sources for sourcing weather, soil, water and irrigation sources, farm equipment and mechanization, farm operation material and relevant information, market price, regional or national level asset price or rate card, regional crop knowledge crop and parts like pest images, drone, rover images, and satellite data.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 distributed across each of the distributed components (servers). The plurality of modules 110 include programs or coded instructions that supplement applications or functions performed by the components of system 100 for executing different steps involved in the process of estimating flexible credit eligibility and disbursement schedule using Non-fungible tokens (NFTs) of agricultural assets, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108, which can be a distributed storage for each of the components such as servers depicted in FIG. 2. The database (or repository) 108 may include a plurality of abstracted pieces of code for refinement and data that is processed, received, or generated as a result of the execution of the plurality of modules in the module(s) 110. The database stores information pertaining to the physical farm assets of a plurality of farmers registered with the system 100, associated farm asset metadata of the physical farm assets, digital data of the physical farm assets, NFTs created for the physical farm assets and associated metadata block of the NFTs, and the like.

Further, the NFT Wallet and Exchange Server 206 within the system 100 includes the blockchain network having the smart contracts and a distributed ledger recording the transaction of assets (herein NFTs)

Although the database 108 is shown internal to the system 100, it will be noted that, in alternate embodiments, the database 108 can also be implemented external to the system 100, and communicatively coupled to the system 100. The data contained within such an external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS) or any non-relational database such as NoSQL or document databases. Functions of the components of the system 100 are now explained with reference to architecture as depicted in FIG. 2 and steps in flow diagrams in FIG. 3A through FIG. 3B.

Figure 3A:
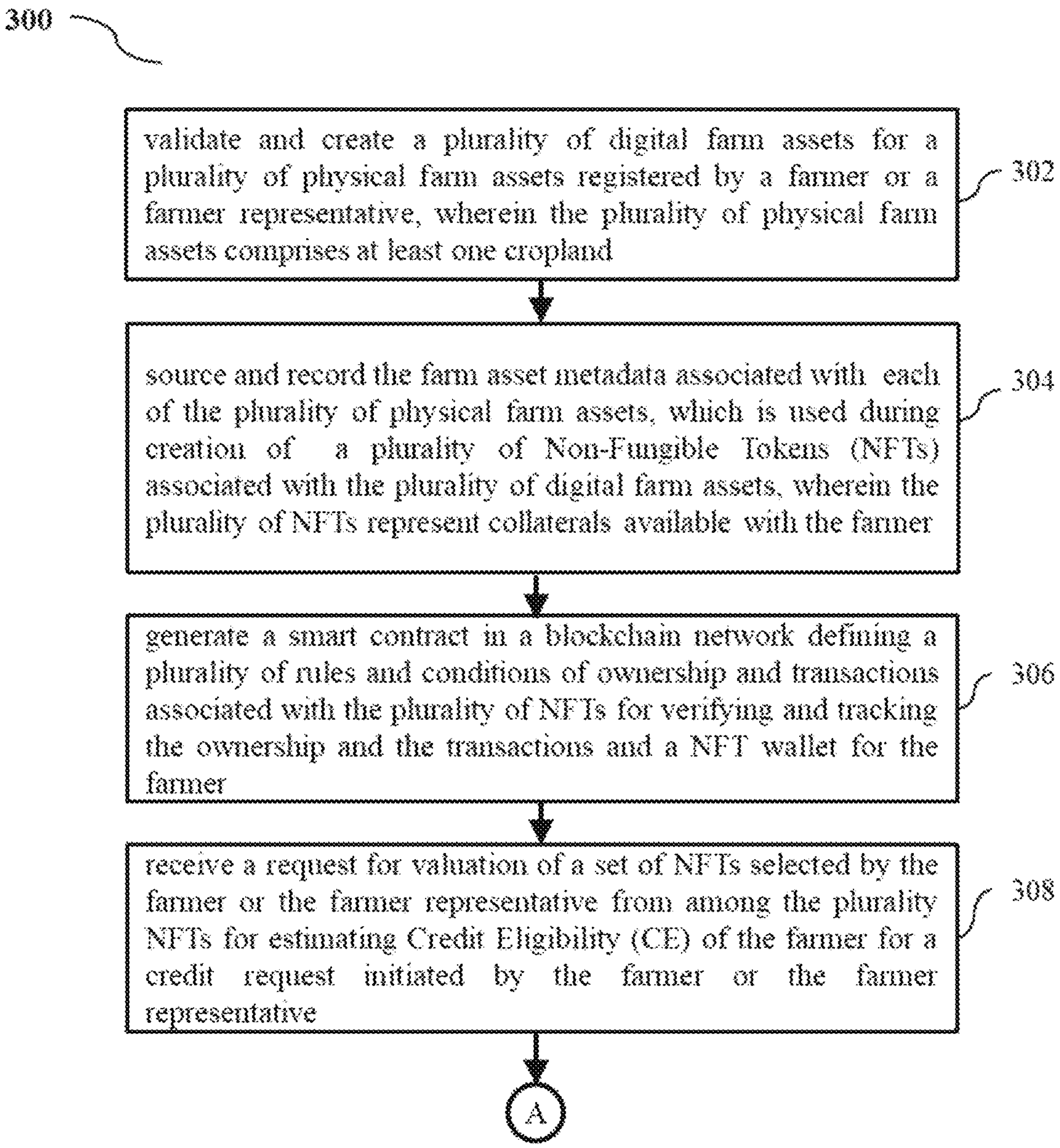
FIGS. 3A through 3B (collectively referred as FIG. 3) is a flow diagram illustrating a method for estimating flexible credit eligibility and disbursement schedule using Non-fungible tokens (NFTs) of agricultural assets, using the system depicted in FIGS. 1 and 2, in accordance with some embodiments of the present disclosure.
Figure 3B:
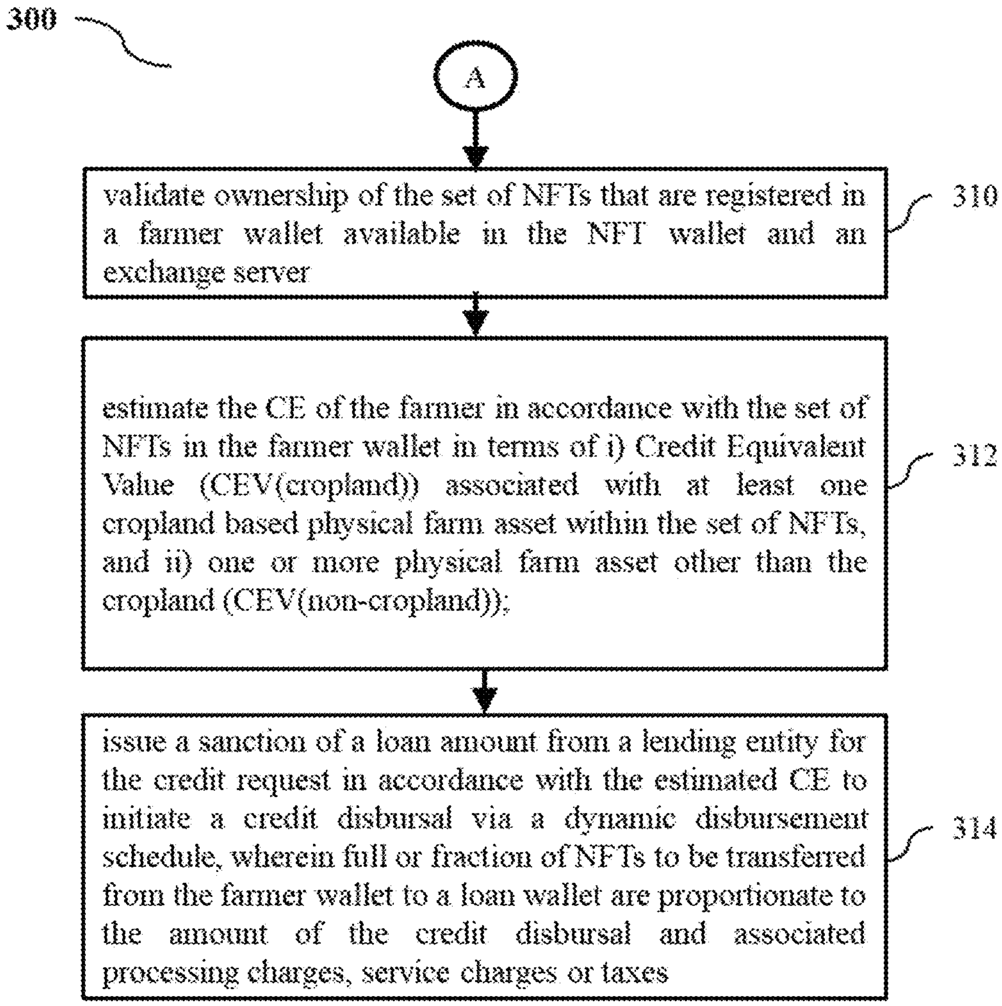

FIGS. 3A through 3B (collectively referred as FIG. 3) is a flow diagram illustrating a method 300 for estimating flexible credit eligibility and disbursement schedule using Non-fungible tokens (NFTs) of agricultural assets, using the system depicted in FIGS. 1 and 2, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIGS. 1 and 2 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

With reference architecture of the system 100 depicted in FIG. 2 and referring to the steps of the method 300, at step 302 of the method 300, the one or more hardware processors 104 of the digital asset server 202 are configured by the instruction to validate and create a plurality of digital farm assets for a plurality of physical farm assets registered by a farmer or a farmer representative. The plurality of physical farm assets comprises at least one cropland. The plurality of digital farm assets are then recorded into blockchain network by creating corresponding plurality of NFTs by the NFT Wallet and Exchange Server 204. These physical farm assets are registered by a farmer or a farmer representative into the digital asset server 202 and may be text, images and video in digital form, paper documents later scanned into the system 100. The farmer representative herein refers to an authorized agent for the farmer, in capacity to communicate with the system 100 for registering digital farm asset or communicating with the system 100 for actions associated with the NFTed assets corresponding to the digital farm assets. Prior to registering the physical farm assets provided by the farmer, the digital asset server 202 performs a validation check to ensure if a physical farm asset can be NFTed, and only then proceeds with registration. This will include checking the list of the assets recognized by lending institutions and regional government as assets which can be considered as collateral for the estimation of the credit eligibility. This can include entities which are owned by the farmer with clear government recognized proof of ownership, and each entity having certain utility and monetary value such as, but not limited to, cropland, farm equipment, implement, natural resources like borewell, open well, farm-pond, farm produce or trees or plants, digital assets, etc., Each entity is compared with the master list available with the NFT exchange as published by the government entities and lending institution which are members of blockchain network NFT Wallet and Exchange server 204. Based on the associated asset list criteria and the detailed guidelines, the asset is registered as NFT or rejected. The process is iteratively repeated for all the assets provided by the farmer or farmer representative for this purpose.

The system 100 ensures that the plurality of farm assets comprises at least one cropland when plurality of farmers approach to register the physical farm assets owned by them. It can be well understood that cropland is the main credit collateral of interest for any lending entity, hence this check performed by the digital asset server 202 is critical. The non-cropland agricultural assets are additional valuation to the main collateral against. For example, land records and other documents obtained by the farmer from standard land authorities of the corresponding region can be one of the verification source for cropland assets.

The digital asset server 202: Generates or creates the unique digital form of various physical farm assets into digital farm assets later represented by NFTs into a farmer wallet of the NFT Wallet and Exchange Server 204. As can be seen in FIG. 2, a farm wallet is created for each farmer, and a loan wallet (within the NFT wallet) is created for the lending entity such as the bank, which has compiled data of ownership transferred NFTs of each farmer. The digital farm assets can be generated by various techniques to gather and record information associated with each physical farm asset. It can be a combination of one or more information such as digital spatial view or photo of the farm taken at a certain vertical height from a flying object such as balloon, drone, airplane, or satellite, along with geocoordinate and/or unique farm identifier given by regional or federal government authority. It can be unique identifier of a farm equipment such as body or engine chassis number or registration number plate superimposed on its digital photo or the unique animal identifier like RFID tag number or muzzle print along with its photos taken from different angle and its history, optionally validated and physically, or digitally signed by the information collecting agent or appropriate officer or authority. It can be the photographs and geocoordinate of the immoveable objects like water bodies such as well or borewell piece of content that the NFT represents with date and time stamp up to seconds value. It can also capture the proof of ownership in physical and/or digital format. These can be either static in nature or can be an interactive piece which can respond to user input. The information associated with a physical farm asset, that is provided by the farmer is not restricted to digital images or scanned document but can also be provided an interface to enable overlay of information over digitized information of submitted asset related information. This enhances the end user experience at farmer end. This asset or assets can be registered as offerings under the specific asset, instrumentation and/or securities Acts of a country, allowing them for a transaction. Hence, the sellers (or entity transferring the ownership) of NFTs are liable to provide complete information which should not be materially misleading, and hence they are liable to purchasers or mortgaging agency under various federal Rules and laws, and may be criminally penalize for violations, if any.

At step 304 of the method 300, the one or more hardware processors 104 of the digital asset server 202 are configured by the instruction to source and record a farm asset metadata associated with each of the plurality of physical farm assets, wherein the farm asset metadata is used by the NFT wallet and exchange server 204 during creation of a plurality of Non-Fungible Tokens (NFTs) associated with the plurality of digital farm assets. The plurality of NFTs represent collaterals available with the farmer.

The farm asset metadata also captures specific attribute information of individual farm assets, for example, cropland can have geotagged field boundary, date of creation. Livestock specific metadata include animal type, birth date, breed, age, sex, milking capacity, existing loan certificate, if any, health history report, etc. Tractor and farm implement specific metadata includes date of purchase, model/make, purchase value, age, usage such as distance travelled, proof of ownership. Well (water source) specific metadata includes location of the well, date/year since well is available, monthly average depth at which water is available. It will also have the physical world unique identity of the assets, to achieve a coherence between the two world-physical and digital.

For the assets with definite expiry date such as farm equipment, livestock, well etc., farm asset metadata also includes a system calculated “asset inactive date” which is based on domain or expert knowledge in the sector maximum utility period or any regional or governmental guidelines or rules. Post this asset inactive date, or any other date earlier to this, when the said asset has ceased to exist such as death in case of livestock or destruction in case of equipment, the digital assets server 202 in the system 100 marks the farm asset as expired and associated NFTs are debited from farmer wallet within the NFT wallet block. The system 100 ensures these expired NFTs are not traded anymore. However, all historical information can still be retrieved from the system 100, as and when needed. If there is any loan on these NFTs, then the lending entity is communicated with a notification of such events. The lending entity can then generate an equivalent amount of NFTs transfer from the farmer wallet to loan wallet and the financial transaction exchange will be notified. The process in this case remains the same as mentioned earlier for the NFT transfer.

Additionally, the NFT wallet and exchange server 204 further generates a metadata block for NFTs, which includes information about the NFT, such as its name, type and description, date, timestamp of creation and creator. It can include the data from multiple sources such as creator unique token ID or key or biometric data, location data, etc. for verification and authentication to the NFT and bring additional layer of security. This metadata block information is later utilized for validation of NFTs during the financial transactions.

At step 306 of the method 300, the one or more hardware processors 104 of the NFT wallet and exchange server 204 are configured by the instruction to generate a smart contract in the blockchain network. A block of smart contracts in the blockchain defines a plurality of rules and conditions of ownership and one or more transactions associated with the plurality of NFTs for verifying and tracking the ownership and the one or more transactions and a NFT wallet for the farmer. A transaction comprises full or partial transfer of the plurality of NFTs i) between the farmer and the farmer representative for processing fees, and ii) between the farmer and the lending entity or the mortgaging entity depending upon the financial value for credit availed against the credit collateral and processing charges or applicable taxation of the credit request.

At step 308 of the method 300, the one or more hardware processors 104 of the farm asset valuation server 206 are configured by the instruction to receive a request for valuation of a set of NFTs selected by the farmer or the farmer representative from among the plurality NFTs for estimating Credit Eligibility (CE) of the farmer for a credit request initiated by the farmer or the farmer representative. The CE estimation is explained later with associated formulae for an use case an example. The farmer or the farmer representative has the option to raise the credit request i) before start of a crop season of at least one crop planned by the farmer for the at least one cropland or ii) during the crop season.

The farm asset valuation server 206: Performs asset valuation to estimate Credit Eligibility (CE) based on various criteria and asset specific attributes such as type, health, life, utility, etc. of the asset (cropland, animal, farm equipment, well etc.), the asset valuation is done. For this purpose, respective regional or global, prevalent, rate card(s) can be referenced. The objective is to create a standard valuation system, so that it can bring parity among all the stakeholders, especially the current and prospective future owners. Hence, the reference valuation checklist and associated price in local currency can be fetched from an (or more) external server(s) (not shown in the above diagram), which can be used for the above valuation. Accordingly, an NFT issuing request is sent to the NFT wallet and exchange server 204 to register or issue or transfer one or more NFTs (in proportion to the associated digital assets and the contractual rules as per the smart contract to be executed).

At step 310 of the method 300, the one or more hardware processors 104 of NFT wallet and exchange server 204 are configured by the instruction to validate ownership of the set of NFTs that are registered in the farmer wallet available in the NFT wallet and an exchange server 204. The metadata block associated with the NFT can be used to track the transaction and a ownership history of the digital farm asset, bringing an additional layer of transparency.

At step 312 of the method 300, the one or more hardware processors 104 of the farm asset valuation server 206 are configured by the instruction to estimating the CE of the farmer in accordance with the set of NFTs in the farmer wallet in terms of i) Credit Equivalent Value (CEV(cropland)) associated with at least one cropland based physical farm asset within the set of NFTs, and ii) one or more physical farm asset other than the cropland (CEV(non-cropland)). The computation of CE and the entire method steps can be better understood in conjunction with the use case explained later.

At step 314 of the method 300, the one or more hardware processors 104 of the financial transaction server 208 are configured by the instruction to issue a sanction of a loan amount from a lending entity for the credit request in accordance with the estimated CE to initiate a credit disbursal via a dynamic disbursement schedule comprising an initial disbursement schedule based on a current status of the set of the digital farm assets that is dynamically altered based on real time data. A full or fraction of the NFTs among the set of NFTs to be transferred from the farmer wallet to a loan wallet are proportionate to the amount of the credit disbursal and associated processing charges, service charges or taxes. This way, though the ownership of the NFT remains with the owner (farmer), they cannot be included in any kind of digital transactions till the lien on these NFTs are not lifted. The dynamic disbursement schedule implemented in accordance with following steps:

Step 314*a*—Generate an initial disbursement schedule based on a current status of the set of the digital farm assets derived from real-time data associated with at least one crop planned by the farmer for the at least one cropland, soil quality of the at least one cropland, forecasted weather in geography of the at least one cropland and personalized package of practices generated for the farmer. The real time data is sourced from at least one of the on-field sensors, the satellite data, and the external data sources;

Step 314*b*—Dynamically alter the initial disbursement schedule in accordance with the real time data based on one of:

a) Real-time prediction or detection of events or change in state of the crop occurred post generating the initial disbursement schedule. The event or change in state of the crop is determined based on real time data sourced from at least one of the on-field sensors, the satellite data, and the external data sources.

b) A real time request supported by an event information from the farmer or the farmer representative for an additional credit disbursal. The event information is validated based on the real time data sourced from at least one of the on-field sensors, the satellite data, and the external data or supported by authorized field surveys.

Further, NFTs or fraction of the NFTs among the set of NFTs are transferred back from the loan wallet to the farmer wallet in accordance with a full or partial repayment of the credit in accordance with the smart contract.

NFT Wallet and Exchange Server 204: This component of the system 100 identifies a physical farm asset NFT token from the NFT registration request message received from the farmer or farmer representative. This token is registered in a Farm Asset NFT Exchange (FANFTE). For each asset owner, it creates a digital wallet also referred to as NFT wallet such as Farmer Wallet uniquely identified and associated with the given farmer. The tokens are linked with this NFT wallet for the ease of operation.

If an ownership transfer request is received, it accordingly delinks the equal amount of full or fractional NFTs from the current owner wallet and links them with the new owner wallet.

If the ownership transfer request is for the fractional NFT, then the NFTs are accordingly fractionalized or divides the main NFT tokens in the owner wallet in the required ratio mentioned in the transfer request message to generate sub-NFT tokens and are then delinked/linked from and to, old owner to new owner.

If the smart contract rule indicates a service fee or the percentage commission to be paid, then accordingly the percentage of the purchase (or transaction) amount is calculated and equivalent NFT or fractional NFT are credited to the loan wallet (leasing or servicing agent wallet) created in FANFTE, as a commission. This also makes the entire transaction transparent from the taxation perspective.

To mortgage the digital farm assets, the NFT Mortgage lending entity Node 210 raises a mortgage request with the list of the linked digital asset, loan amount, loan information, terms and conditions and generate loan transaction block to asset valuation server via Financial Transaction Server 208.

The NFT Mortgage lending entity Node 210: This is a node for entities such as Lending Agency or Buyer or Leasing agency to interact with e system 100. The NFT Mortgage lending entity Node 210 is configured to send the NFT ownership transfer (or buying) or mortgage or leasing request message. It may be for the 100% of the NFT or could be in a pre-agreed ownership ratio of the NFTs or fraction of NFT proportionate of credit amount disbursed. Further, post credit disbursal, one or more NFTs among the set of NFTs are transferred back from the loan wallet to the farmer wallet in accordance with a full or partial repayment of the credit disbursal amount, interest and other government or service charges, in accordance with the smart contract.

For the asset NFTs which are mortgaged, post all the procedural formalities, a separate mortgage or collateral digital loan wallet or read-only wallet is created and the equivalent amount of the NFTs (or fractions) are moved to this from the farmers wallet. This way though the ownership remains with the owner (farmer), they cannot be included in any kind of digital transactions till the lien on these NFTs are not lifted.

This gives the flexibility to both owner and the mortgaging agency lending entity such as bank), in tandem, to add/remove the NFTs depending on the loan disbursal amount or repayment amount till the entire dues remain still unpaid. This makes the overall lending process flexible and transparent, avoiding fraudulent transactions. If there are any interest rate changes or taxation changes or subsidies available, in such scenarios as well the NFTs can move from the farmer's wallet to loan wallet and vice-versa.

In case of insufficient NFTs in the owner's/farmer wallet, for the transactions already committed in the loan wallet, an equivalent overdue NFTs is reflected, and such information also can be shared with any third party credit score management agency.

If the assets are moved to the new owners due to inheritance or succession or auction, then mortgage agency NFT Mortgage Node lending entity provides their electronic consent to the farm asset valuation server 206 with the required information of the earlier loan transaction and the loan wallet will be updated with the details of the new owners.

In case of mortgage cancellation, a request message is sent to financial transaction server 208 with the required information to release the lien assets from the loan wallet. Accordingly, those NFTs are moved back to the original owner wallet (farmer wallet) from the loan wallet and are available for trading to the farmer.

If the owner decides to cancel (and detach) the digital asset with the physical asset, and if there are no lien on the digital assets or NFTs and the ownership is also verified, then the NFTs are junked and devalued, and the associated digital assets will be marked as non-NFT assets and ownership will not be tracked further. But the history of such an asset is still visible in the details of the last known owner. That asset may return to the NFT exchange with the newer NFTs and tracking as fresh NFT.

Use Case Scenario:

Registration of Farmer and his agricultural assets into NFT platform: Farmers, who would like to use the credit, can register themselves in the system and also add agricultural assets available with them. The digital asset server 202 of the system 100 decides all/subset of the registered agricultural assets eligible for NFT and requests farmer to confirm the agricultural assets they would like to do the NFT. By this way, system 100 can store information about the farmers registered on the platform with agricultural assets which they would like to generate the NFT for. Additionally, while registering the agricultural assets, farmer needs to provide the attributes/metadata about each of those assets. Few examples of attributes includes 1) Agricultural land: Geo-tagged field boundary, proof of ownership, Crops grown on the land in past seasons, approximate crop production in tons, soil health status, weather patterns, etc.
2) Tractor and Farm Implements: date of purchase, model/make, purchase value, age, proof of ownership, no lien certificate, current geographic location, or geo-tagging
3) Livestock: Animal type, sex, age, milking capacity (if applicable), pregnancy status, no lien certificate, unique identifier as per local government recommendation, geographic location, etc.
4) Well: location of the well, date/year since well is available, average depth of the water during summer season or every month in last one year. Well-type open/tube well, depth (in meters), rainfall in current and previous year in the region, groundwater levels in the region
5) Additional attributes can be derived by the system 100 via a crop monitoring and analytics engine, those include crop health, crop produce quality, potential carbon sequestrated due to farming practices followed, etc.

Estimation of Credit Eligibility (CE) for farmer: The credit equivalent value (CEV) for various agricultural assets NFTed by the is described herein. The method 300 considers the static and dynamic components associated with the farm cropland. Static value is decided based on the historical information associated with the farm in terms of crops cultivated, temporal soil health, yield obtained in each of the past seasons, revenue generated and sustainability parameters etc. This value is updated every season as each season can add crops and associated attributes which will help to update this value every season.

Computing CEV(Cropland):

$$\text{CEV(Agri-Static)}=f(\text{historical(crops,soil health,yield, revenue,GHG emissions)}) \quad (1)$$

Moreover, dynamic value associated with agri-land or cropland changes over time due to factor such as proximity to market, location of land $$\text{CEV(Agri-Land) or CEV(cropland)=CEV(Agri-Static)+CEV(Agri-Dynamic)} \quad (2)$$

Computing CEV(Non-Cropland) for Owned Assets Other than Cropland.

Tractor and Implements: These agricultural assets are depreciating in nature and the CEV is calculated for tractor and implements as follows:

$$\text{CEV(Tractor)}=f(\text{Date of purchase,model/make,purchase value,depreciation rate}) \quad (3)$$

$$\text{CEV(Implements)}=f(\text{Date of purchase,model/make, purchase value,depreciation rate}) \quad (4)$$

CEV of such assets is further slightly reduced by considering the length of the current season and associated depreciation factor Livestock: These agricultural assets are appreciating in nature up to a certain age and then starts depreciating in value). CEV for such assets is calculated as follows for different types of livestock as an example, but not limited to only those:

$$\text{CEV(cow)}=f(\text{breed,age,milking capacity}) \quad (5)$$

$$\text{CEV(bullock)}=f(\text{breed,age}) \quad (6)$$

$$\text{CEV(Livestock) is the summation of CEV of all available livestock} \quad (7)$$

Wells: These agricultural assets have both appreciating and depreciating characteristics depending upon the many factors such as location, depth, rainfall, groundwater levels, etc.

$$\text{CEV(well)}=f(\text{location,historical and current rainfall, groundwater levels}) \quad (8)$$

Credit eligibility is the summation of CEVs of all agricultural assets of the farmer $$\text{CE=CEV(Agri-Land)+CEV(Tractor)+CEV(Implements)+CEV(Livestock)+CEV(well)} \quad (9)$$

Farmers can choose NFTed agricultural assets they would like to add for loan collateral and their CE will be calculated accordingly.

Irrigation equipment: The irrigation equipment includes the electric/diesel/solar powered pump, drip or sprinkler set, underground or aboveground irrigation pipeline, etc.

Estimation/Generation of Automatic Dynamic Disbursement Schedule (ADSS): The system 100 financial transaction server 208 provides full credit disbursal (initial disbursement schedule) which is dynamically altered based on certain conditions as explained below:

A. The information on CE value of the farm evaluated by the system 100 is obtained, while current status of the farm and crop m and information on the farm such as location, weather pattern, soil type, health, crops grown in history and crop planned for the current season, proximity to market and rates of labor, rent of tractor farm implements, current and forecasted rates of seeds and other agri-inputs such as chemicals, pesticides, herbicides etc.

B. Crop monitoring and analytics is performed to generate the personalized schedule of farm operations (including the pre-sowing activities) associated with the farm.

C. Based on the actual need of the various farm operations and activities and associated current and forecasted prices of various agri-input, labor, implement etc., the system 100 generates disbursement schedule before the start of the season.

$$\text{ADSS(start)}=f(\text{crop/s,weather,soil type/health,personalized schedule,prices/rates of various of inputs/operations}) \quad (10)$$

One example of ACDS(starts) can be 20% of CE before the start of the season, 35% of CE during 1-40 days of sowing, 30% of CE during 41-90 days of sowing, 5% CE during 91 days-harvest and remaining 10% of CE for market/transport of produce.

ACDS is updated as the season progresses. The system 100 via the on field sensors, satellite data and external information corresponding to weather in seamlessly (in real time) monitors the said field (cropland) to check and predict the any calamities, losses due to pest/diseases etc. If any such situations are predicted by the system 100, access to the equivalent credit can be provided to the farmer. The system 100 is also flexible enough to get the request from farmer for additional credit at any point during the growing season. Based on the request and reason associated with it, the system 100 can validate the request using sourced current status of the field and access to equivalent credit be also provided to the farmers.

The system 100 with architecture as depicted in FIG. 2 and the method 300 is explained with an end to end use case example below:

A farmer with an acre of cropland or so may have other agriculture asset such as an open or bore-well, irrigation pump, a tracker, implements, few cattle, goats/sheep, poultry, produce from earlier harvest, etc. These assets can be monetized from time to time by taking loans against them. The amount of loan, duration of the loan, interest rate, terms, and conditions, etc. may change depending on the assets. But in most countries farmers get the loan for the immovable assets like cropland only. So, in the system 100 disclosed herein, a farmer with the above or similar or other asset, is able to raise a credit request (either directly or through a qualified, skilled agent referred to as farmer representative). The system 100 collects multiple types of farm asset metadata for each type of the assets from varying source such as physical records, human assessment using a mobile app, IoT or mobile phone camera sensors, drone or satellite image based remote sensing, etc. either for the current time and/or also historical data acquisitions, depending on what is possible. The farm asset metadata is used to create an equivalent digital farm asset in the Digital Asset Server 202. Then for each digital asset an NFT is created into the blockchain into a Farm Asset NFT SmartContract module in the NFT wallet and exchange server 204, wherein the smart contract is recorded. Terms of use associated with each assets may vary, such as is it saleable, transferrable, living-non-living, regulations, etc. Hence, now each NFT represents each asset and then can be transferred in the digital world, and the authenticity, the journey, rights of ownership, and use can be tracked. The NFT wallet and exchange server 204 provides a virtual NFT wallet, where NFTs assigned to farmers can be stored as farmer wallet, while NFTs transferred to a lending entity (lending agency such as a Bank) can be stored in the loan wallet.

When a farmer applies for the loan against selected NFTs (or all the NFT assets), then he/she authorizes the bank to fetch the details of each asset from the NFT SmartContract module in the NFT wallet and exchange server 204. Bank or Mortgage agency or lending institution, contacts a central Financial Transaction Exchange (such as the financial transaction server 208) or a third party agency to keep record of all the financial transactions associated with the NFTs in such environment as per the central/financial regulating authority of the country/region. The financial transaction server 208 contacts a Farm Asset Valuator (such as the Farm Asset Valuation Server 206), which is one of a node on blockchain network and hence has the visibility to the network and its elements. It checks the available NFTs with the farmer wallet and its properties and terms and conditions. It uses a country or region specific comparatively dynamic rate card (database) for various assets to bring a parity among the assets of similar types based on associated characteristics of the asset. The farm asset valuation server 206 returns back the required details along with the monetary value. This information travels back to Bank (NFT mortgage lending entity node 210) via the financial transaction server 208. The financial transaction server 208 uses this to assess farmers credit value, depending on the assets requested and used for the assessment. The Bank (NFT mortgage lending entity node 210) performs the regular validations in addition to the above and then finally a decision to grant or not grant the credit (loan amount) or fraction to be granted is reached based on the requested amount. The decision is taken in tandem with the farmer. Accordingly, the dynamic disbursement schedule is prepared and the amortization chart highlighting the Equal Monthly Installment (EMI), loan principle, interest rate, no. of NFTs or fraction of the NFTs which should remain mortgaged in Bank locker, etc., is generated. Accordingly, the contract is digitally signed and then the bank sends the request both to the financial transaction server 208 and the NFT Wallet and Exchange server 204. The farmer NFTs are fractionalized and lien fractional quantity is put in the loan wallet for the duration of the loan. With repayment of the loan amount, the NFTs are fractioned further and are returned from the loan wallet to the farmer wallet.

If during this period, farmer sales any of these assets or leases to another entity, it is important to seek the bank's consent and make the appropriate system changes. Hence, once the bank approves the requests via existing mechanism, then the documentations are modified, new owner (in case of buy-sell) loan agreement is made with the bank and the same is informed to the financial transaction server 208 and NFT wallet and exchange server 204 through a new transaction.

For any additional loan request, the entire process is repeated. Post all the payments of the associated assets, then the bank informs the financial transaction server 208 and NFT wallet and exchange server 204 and the lien is lifted and NFTs are transferred from the loan wallet to the farmer wallet.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor implemented method, the method comprising:

validating and creating, via one or more hardware processors, a plurality of digital farm assets for a plurality of physical farm assets registered by a farmer or a farmer representative, wherein the plurality of physical farm assets comprises at least one cropland;

deciding, by a digital asset server, whether all or subset of the registered plurality of physical farm assets eligible for Non-Fungible Token (NFT) and requests the farmer to confirm the plurality of physical farm assets to do the NFT, and storing information of the farmers registered with the plurality of physical farm assets to generate the NFT;

performing a validation check, by the digital asset server, prior to registering the plurality of physical farm assets provided by the farmer, to ensure if a physical farm asset can be NFTed, and then proceeds with the registration, wherein the validation check includes checking a list of farm assets recognized by lending institutions and regional government as farm assets which are considered as collateral for an estimation of a credit eligibility;

comparing each farm asset with a master list available with a NFT wallet and exchange server as published by the lending institutions and regional government which are members of a blockchain network and based on an associated asset list criteria and detailed guidelines, the farm asset is registered as NFT or rejected and the process is iteratively repeated for all the farm assets provided by the farmer or the farmer representative;

sourcing and recording, via the one or more hardware processors, a farm asset metadata associated with each of the plurality of physical farm assets;

creating a plurality of Non-Fungible Tokens (NFTs) associated with the plurality of digital farm assets using the farm asset metadata, wherein the plurality of NFTs represent collaterals available with the farmer, wherein the farm asset metadata for the physical farm assets with definite expiry date includes a system calculated asset inactive date, wherein when the physical farm asset ceased to exist post the asset inactive date, the digital asset server marks the physical farm asset as expired and associated NFTs are debited from a farmer wallet within a NFT wallet;

communicating, when any loan on the associated NFTs, to a lending entity with a notification of events and the lending entity generates an equivalent amount of NFTs transfer from the farmer wallet to a loan wallet and a financial transaction exchange is notified;

recording the plurality of digital farm assets into the blockchain network by creating the plurality of NFTs by the NFT wallet and exchange server generating, by the NFT wallet and exchange server, a metadata for the plurality of NFTs including an information of each of the NFT comprising a name of the NFT, a type and description, date, timestamp of creation and creator of the NFT, the creator's unique token ID or key or biometric data, a location data, for verification and authentication to the NFT for additional layer of security and the generated metadata information is later utilized for validation of the plurality of NFTs during financial transactions;

deriving an additional metadata associated with each of the plurality of physical farm assets via a crop monitoring and analytics engine including a crop health, a crop produce quality, potential carbon sequestrated due to farming practices followed;

generating, via the one or more hardware processors, a smart contract in the blockchain network defining a plurality of rules and conditions of ownership and one or more transactions associated with the plurality of NFTs for verifying and tracking the ownership, and the one or more transactions and the NFT wallet for the farmer;

receiving, via the one or more hardware processors, a request for valuation of a set of NFTs selected by the farmer or the farmer representative from among the plurality NFTs for estimating Credit Eligibility (CE) of the farmer for a credit request initiated by the farmer or the farmer representative;

performing the valuation of the set of NFTs, by a farm asset valuation server, by fetching a reference valuation checklist and an associated price in a local currency from one or more external servers, wherein the farm asset valuation server is a node on the blockchain network and uses a country or region specific comparatively dynamic rate card database for various assets to bring parity among all stakeholders and among the farm assets of similar types based on associated characteristics of the farm asset;

validating, via the one or more hardware processors, ownership of the set of NFTs that are registered in the farmer wallet available in the NFT wallet and exchange server, wherein when an ownership transfer request is received, then the NFT wallet and exchange server delinks an equal amount of full or fractional NFTs from a current owner wallet and links them with the new owner wallet, wherein when the ownership transfer request is for the fractional NFT, then the NFTs are fractionalized or divides main NFT tokens in the owner wallet in the required ratio mentioned in a transfer request message to generate sub-NFT tokens and are then delinked or linked from and to, current owner to new owner;

estimating, via the one or more hardware processors, the CE of the farmer in accordance with the set of NFTs in the farmer wallet in terms of i) Credit Equivalent Value (CEV (cropland)) associated with at least one cropland based physical farm asset within the set of NFTs, and ii) one or more physical farm asset other than the cropland (CEV (non-cropland)), wherein estimating the CEV (cropland) considers static and dynamic components associated with the cropland, wherein a static value is decided based on historical information associated with the cropland in terms of crops cultivated, temporal soil health, yield obtained in each of past seasons, revenue generated and sustainability parameters and the static value is updated every season as each season add crops and associated attributes to update the static value every season, and wherein a dynamic value associated with the cropland changes over time due to factors including proximity to market, location of land;

issuing, via the one or more hardware processors, a sanction of a loan amount from a lending entity for the credit request in accordance with the estimated CE to initiate a credit disbursal via a dynamic disbursement schedule comprising an initial disbursement schedule based on a current status of the set of the digital farm assets that is dynamically altered based on real time data, wherein full or fraction of the NFTs among the set of NFTs to be transferred from the farmer wallet to a loan wallet are proportionate to the amount of the credit disbursal and associated processing charges, service charges or taxes, wherein the dynamic disbursement schedule is based on personalized or customized parameters associated with the current status of a farm and the set of the digital farm assets linked to a credit collateral, wherein the dynamic disbursement schedule comprising:

generating the initial disbursement schedule based on the current status of the set of the digital farm assets derived from real-time data associated with at least one crop planned by the farmer for the at least one cropland, soil quality of the at least one cropland, forecasted weather in geography of the at least one cropland and personalized package of practices generated for the farmer, wherein the real time data is sourced from at least one of on-field sensors, satellite data and external data sources; and dynamically altering the initial disbursement schedule in accordance with the real time data based on one of:

real-time prediction or detection of events or change in state of the crop occurred post generating the initial disbursement schedule, wherein the events or change in state of the crop is determined based on the real time data; and a real time request supported by an event information from the farmer or the farmer representative for an additional credit disbursal, wherein the event information is validated based on the real time data or supported by authorized field survey, wherein for the mortgaged NFTs, a separate mortgage or collateral digital loan wallet or read-only wallet is created and an equivalent amount of the NFTs is moved to the mortgage or collateral digital loan wallet or the read-only wallet from the farmer wallet, wherein while the NFTs are in the mortgage or collateral digital loan wallet or the read-only wallet, ownership of the NFTs remains with the farmer and the NFTs are excluded from digital transactions until a lien on the NFTs is released, wherein when the physical farm assets are moved to a new owner due to inheritance or succession or auction, then an NFT Mortgage Node lending entity provides electronic consent to a farm asset valuation server with required information of the earlier loan transaction and the loan wallet is updated with the details of the new owner;

generating an amortization chart highlighting an Equal Monthly Installment (EMI), loan principle, interest rate, number of NFTs or fraction of the NFTs which remain mortgaged in a bank locker, based on the dynamic disbursement schedule;

digitally signing a contract and the bank sending a request to a financial transaction server and the NFT wallet and exchange server, and the farmer NFTs are fractionalized and lien fractional quantity is added in the loan wallet for the duration of the loan and with repayment of the loan amount, the NFTs are fractioned further and are returned from the loan wallet to the farmer wallet;

monitoring in real-time, via the on field sensors, satellite data and external information corresponding to weather, the cropland to check and predict calamities, losses due to pest or diseases and upon predicting the calamities, losses due to pest or diseases, providing access to an equivalent credit to the farmer and the dynamic disbursement schedule is updated as a season progresses; and validating a request by the farmer for additional credit at any point during a growing season using sourced current status of the cropland and access to the equivalent credit is provided to the farmer based on the request and associated reason.

2. The processor implemented method of 1, further comprising:

gathering and recording a combination of one or more information associated with each physical farm asset upon creation of the plurality of digital farm assets, wherein the one or more information including a digital spatial view or a photo of a farm taken at a certain vertical height from a flying object including a balloon, a drone, an airplane, or a satellite, an interface to enable overlay of information over digitized information of submitted asset related information, along with a geo-coordinate and a unique farm identifier given by a regional or a federal government authority, wherein the farm asset metadata associated with each of the plurality of physical farm assets is collected from a plurality of sources including physical records, a human assessment using a mobile app, Internet of Things (IoT) or mobile phone camera sensors, a drone or a satellite image based remote sensing for a current time and historical data acquisitions.

3. The processor implemented method of claim 1, wherein the full or the fraction of the NFTs among the set of NFTs are transferred back from the loan wallet to the farmer wallet in accordance with a full or partial repayment of the credit in accordance with the smart contract, wherein when the NFTs are insufficient in the farmer wallet, for the transactions already committed in the loan wallet, an equivalent overdue NFTs is reflected, wherein when mortgage of the mortgaged NFTs is cancelled, a request message is sent to the financial transaction server with required information to release the lien assets from the loan wallet and the NFTs are moved back to the farmer wallet from the loan wallet, wherein when a owner decides to cancel and detach the digital asset with the physical asset, and when there are no lien on the digital assets or the NFTs and the ownership is also verified, then the NFTs are junked and devalued, and the associated digital assets are marked as non-NFT assets and the ownership is not tracked further, wherein when farmer sales the farm assets or leases to another entity during the period of the loan, then loan documentations are modified upon approval from a mortgaging agency lending entity, and a new owner loan agreement is made and informed to a financial transaction server and the NFT wallet and exchange server through a new transaction.

4. The processor implemented method of claim 1, wherein the one or more physical farm asset other than the cropland (CEV (non-cropland)) comprise livestock, a well, a tractor, and one or more farm implements.

5. The processor implemented method of claim 1, wherein the farmer or the farmer representative raises the credit request i) before start of a crop season of the at least one crop planned by the farmer for the at least one cropland or ii) during the crop season.

6. The processor implemented method of claim 1, wherein each of the plurality of NFTs is associated with a metadata block comprising a NFT creation date, ownership, attributes describing unique properties of the NFT, geo-locational and temporal attributes associated with the NFT, and wherein the metadata block associated with the NFT is used to track the one or more transactions and a ownership history of the digital farm asset, bringing an additional layer of transparency in the transactions.

7. The processor implemented method of claim 1, wherein the one or more transactions comprise a full or partial transfer of the plurality of NFTs i) between the farmer and the farmer representative for processing fees, and ii) between the farmer and the lending entity or a mortgaging entity depending upon the financial value for credit availed against the credit collateral and processing charges or applicable taxation of the credit request.

8. A system comprising:

a plurality of components comprising a digital asset server, a farm asset, a NFT wallet and exchange server, a farm asset valuation server, a financial transaction server and a NFT mortgage lending entity node, each of the plurality of components comprising:

a memory storing instructions;

one or more Input/Output (I/O) interfaces; and one or more hardware processors coupled to the memory via the one or more I/O interfaces, wherein:

the one or more hardware processors of the digital asset server are configured by the instructions to validate and create a plurality of digital farm assets for a plurality of physical farm assets registered by a farmer or a farmer representative, wherein the plurality of physical farm assets comprises at least one cropland;

the one or more hardware processors of the digital asset server are configured by the instructions to decide whether all or subset of the registered plurality of physical farm assets eligible for Non-Fungible Token (NFT) by the digital asset and requests the farmer to confirm the plurality of physical farm assets to do the NFT, and storing information of the farmers registered with the plurality of physical farm assets to generate the NFT;

the one or more hardware processors of the digital asset server are configured by the instructions to perform a validation check prior to registering the plurality of physical farm assets provided by the farmer, to ensure if a physical farm asset can be NFTed, and then proceeds with the registration, wherein the validation check includes checking a list of farm assets recognized by lending institutions and regional government as farm assets which are considered as collateral for an estimation of a credit eligibility;

the one or more hardware processors of the digital asset server are configured by the instructions to compare each farm asset with a master list available with the NFT wallet and exchange server as published by the lending institutions and regional government which are members of a blockchain network and based on an associated asset list criteria and detailed guidelines, the farm asset is registered as NFT or rejected and the process is iteratively repeated for all the farm assets provided by the farmer or the farmer representative;

the one or more hardware processors of the digital asset server are configured by the instructions to source and record a farm asset metadata associated with each of the plurality of physical farm assets;

the one or more hardware processors of the NFT wallet and exchange server are configured by the instructions to create a plurality of Non-Fungible Tokens (NFTs) associated with the plurality of digital farm assets using the farm asset metadata, wherein the plurality of NFTs represent collaterals available with the farmer, wherein the farm asset metadata for the physical farm assets with definite expiry date includes a system calculated asset inactive date, wherein when the physical farm asset ceased to exist post the asset inactive date, the digital asset server marks the physical farm asset as expired and associated NFTs are debited from a farmer wallet within a NFT wallet;

the one or more hardware processors of the NFT wallet and exchange server are configured by the instructions to communicate, when any loan on the associated NFTs, to a lending entity with a notification of events and the lending entity generates an equivalent amount of NFTs transfer from the farmer wallet to a loan wallet and a financial transaction exchange is notified;

the one or more hardware processors of the NFT wallet and exchange server are configured by the instruction to generate a smart contract in the blockchain network defining a plurality of rules and conditions of ownership and one or more transactions associated with the plurality of NFTs for verifying and tracking the ownership and the one or more transactions and the NFT wallet for the farmer;

the one or more hardware processors of the NFT wallet and exchange server are configured by the instruction to record the plurality of digital farm assets into the blockchain network by creating the plurality of NFTs by the NFT wallet and exchange server;

the one or more hardware processors of the NFT wallet and exchange server are configured by the instruction to generate a metadata for the plurality of NFTs including an information of each of the NFT comprising a name of the NFT, a type and description, date, timestamp of creation and creator of the NFT, the creator's unique token ID or key or biometric data, a location data, for verification and authentication to the NFT for additional layer of security and the generated metadata information is later utilized for validation of the plurality of NFTs during financial transactions;

the one or more hardware processors of the NFT wallet and exchange server are configured by the instruction to derive an additional metadata associated with each of the plurality of physical farm assets via a crop monitoring and analytics engine including a crop health, a crop produce quality, potential carbon sequestrated due to farming practices followed;

the one or more hardware processors of the farm asset valuation server are configured by the instruction to receive a request for valuation of a set of NFTs selected by the farmer or the farmer representative from among the plurality NFTs for estimating Credit Eligibility (CE) of the farmer for a credit request initiated by the farmer or the farmer representative;

the one or more hardware processors of the farm asset valuation server are configured by the instruction to perform the valuation of the set of NFTs by fetching a reference valuation checklist and an associated price in a local currency from one or more external servers, wherein the farm asset valuation server is a node on the blockchain network and uses a country or region specific comparatively dynamic rate card database for various assets to bring parity among all stakeholders and among the farm assets of similar types based on associated characteristics of the farm asset;

the one or more hardware processors of the NFT wallet and exchange server are configured by the instruction to validate ownership of the set of NFTs that are registered in the farmer wallet available in the NFT wallet and an exchange server, wherein when an ownership transfer request is received, then the NFT wallet and exchange server delinks an equal amount of full or fractional NFTs from a current owner wallet and links them with the new owner wallet, wherein when the ownership transfer request is for the fractional NFT, then the NFTs are fractionalized or divides main NFT tokens in the owner wallet in the required ratio mentioned in a transfer request message to generate sub-NFT tokens and are then delinked or linked from and to, current owner to new owner;

the one or more hardware processors of the farm asset valuation server are configured by the instructions to estimate the CE of the farmer in accordance with the set of NFTs in the farmer wallet in terms of i) Credit Equivalent Value (CEV (cropland)) associated with at least one cropland based physical farm asset within the set of NFTs, and ii) one or more physical farm asset other than the cropland (CEV (non-cropland)), wherein estimating the CEV (cropland) considers static and dynamic components associated with the cropland, wherein a static value is decided based on historical information associated with the cropland in terms of crops cultivated, temporal soil health, yield obtained in each of past seasons, revenue generated and sustainability parameters and the static value is updated every season as each season add crops and associated attributes to update the static value every season, and wherein a dynamic value associated with the cropland changes over time due to factors including proximity to market, location of land; and the one or more hardware processors of the financial transaction server are configured by the instruction to issue a sanction of a loan amount from a lending entity for the credit request in accordance with the estimated CE to initiate a credit disbursal via a dynamic disbursement schedule comprising an initial disbursement schedule based on a current status of the set of the digital farm assets that is dynamically altered based on real time data, wherein full or fraction of the NFTs among the set of NFTs to be transferred from the farmer wallet to a loan wallet are proportionate to the amount of the credit disbursal and associated processing charges, service charges or taxes, wherein the dynamic disbursement schedule is based on personalized or customized parameters associated with the current status of a farm and the set of the digital farm assets linked to a credit collateral, wherein the dynamic disbursement schedule comprising:

generating the initial disbursement schedule based on the current status of the set of the digital farm assets derived from real-time data associated with at least one crop planned by the farmer for the at least one cropland, soil quality of the at least one cropland, forecasted weather in geography of the at least one cropland and personalized package of practices generated for the farmer, wherein the real time data is sourced from at least one of on-field sensors, satellite data and external data sources; and dynamically altering the initial disbursement schedule in accordance with the real time data based on one of:

real-time prediction or detection of events or change in state of the crop occurred post generating the initial disbursement schedule, wherein the events or change in state of the crop is determined based on the real time data; and a real time request supported by an event information from the farmer or the farmer representative for an additional credit disbursal, wherein the event information is validated based on the real time data or supported by authorized field survey, wherein for the mortgaged NFTs, a separate mortgage or collateral digital loan wallet or read-only wallet is created and an equivalent amount of the NFTs is moved to the mortgage or collateral digital loan wallet or the read-only wallet from the farmer wallet, wherein while the NFTs are in the mortgage or collateral digital loan wallet or the read-only wallet, ownership of the NFTs remains with the farmer and the NFTs are excluded from digital transactions until a lien on the NFTs is released, wherein when the physical farm assets are moved to a new owner due to inheritance or succession or auction, then an NFT Mortgage Node lending entity provides electronic consent to a farm asset valuation server with required information of the earlier loan transaction and the loan wallet is updated with the details of the new owner;

the one or more hardware processors of the financial transaction server are configured by the instruction to generate an amortization chart highlighting an Equal Monthly Installment (EMI), loan principle, interest rate, number of NFTs or fraction of the NFTs which remain mortgaged in a bank locker, based on the dynamic disbursement schedule;

digitally sign a contract and the bank sends a request to a financial transaction server and the NFT wallet and exchange server, and the farmer NFTs are fractionalized and lien fractional quantity is added in the loan wallet for the duration of the loan and with repayment of the loan amount, the NFTs are fractioned further and are returned from the loan wallet to the farmer wallet;

monitor in real-time, via the on field sensors, satellite data and external information corresponding to weather, the cropland to check and predict calamities, losses due to pest or diseases and upon predicting the calamities, losses due to pest or diseases, providing access to an equivalent credit to the farmer and the dynamic disbursement schedule is updated as a season progresses; and validate a request by the farmer for additional credit at any point during a growing season using sourced current status of the cropland and access to the equivalent credit is provided to the farmer based on the request and associated reason.

9. The system of claim 8, wherein the full or the fraction of the NFTs among the set of NFTs are transferred back from the loan wallet to the farmer wallet in accordance with a full or partial repayment of the credit in accordance with the smart contract.

10. The system of claim 8, wherein the one or more physical farm assets other than the cropland (CEV (non-cropland)) comprise livestock, a well, a tractor, and one or more farm implements.

11. The system of claim 8, wherein the farmer or the farmer representative raises the credit request i) before start of a crop season of the at least one crop planned by the farmer for the at least one cropland or ii) during the crop season.

12. The system of claim 8, wherein each of the plurality of NFTs is associated with metadata block comprising a NFT creation date, ownership, attributes describing unique properties of the NFT, geo-locational and temporal attributes associated with the NFT, and wherein the metadata block associated with the NFT is used to track the one or more transactions and a ownership history of the digital farm asset, bringing an additional layer of transparency in the transactions.

13. The system of claim 8, wherein the one or more transactions comprise full or partial transfer of the plurality of NFTs i) between the farmer and the farmer representative for processing fees, and ii) between the farmer and the lending entity or a mortgaging entity depending upon the financial value for credit availed against the credit collateral and processing charges or applicable taxation of the credit request.

14. One or more non-transitory machine-readable information storage mediums comprising one or more instructions which when executed by one or more hardware processors cause:

validating and creating, a plurality of digital farm assets for a plurality of physical farm assets registered by a farmer or a farmer representative, wherein the plurality of physical farm assets comprises at least one cropland;

deciding, by a digital asset server, whether, whether all or subset of the registered plurality of physical farm assets eligible for Non-Fungible Token (NFT) and requests the farmer to confirm the plurality of physical farm assets to do the NFT, and storing information of the farmers registered with the plurality of physical farm assets to generate the NFT;

performing a validation check, by the digital asset server, prior to registering the plurality of physical farm assets provided by the farmer, to ensure if a physical farm asset can be NFTed, and then proceeds with the registration, wherein the validation check includes checking a list of farm assets recognized by lending institutions and regional government as farm assets which are considered as collateral for an estimation of a credit eligibility;

comparing each farm asset with a master list available with a NFT wallet and exchange server as published by the lending institutions and regional government which are members of a blockchain network and based on an associated asset list criteria and detailed guidelines, the farm asset is registered as NFT or rejected and the process is iteratively repeated for all the farm assets provided by the farmer or the farmer representative;

sourcing and recording, a farm asset metadata associated with each of the plurality of physical farm assets; wherein creating the farm asset metadata is used during creation of a plurality of Non-Fungible Tokens (NFTs) associated with the plurality of digital farm assets using the farm asset metadata, wherein the plurality of NFTs represent collaterals available with the farmer, wherein the farm asset metadata for the physical farm assets with definite expiry date includes a system calculated asset inactive date, wherein when the physical farm asset ceased to exist post the asset inactive date, the digital asset server marks the physical farm asset as expired and associated NFTs are debited from a farmer wallet within a NFT wallet;

communicating, when any loan on the associated NFTs, to a lending entity is communicated with a notification of events and the lending entity generates an equivalent amount of NFTs transfer from the farmer wallet to a loan wallet and a financial transaction exchange is notified;

recording the plurality of digital farm assets into the blockchain network by creating the plurality of NFTs by the NFT wallet and exchange server;

generating, by the NFT wallet and exchange server, a metadata for the plurality of NFTs the NFT wallet and exchange server further generates a metadata for the plurality of NFTs including an information of each of the NFT comprising a name of the NFT, a type and description, date, timestamp of creation and creator of the NFT, the creator's unique token ID or key or biometric data, a location data, for verification and authentication to the NFT for additional layer of security and the generated metadata information is later utilized for validation of the plurality of NFTs during financial transactions;

deriving an additional metadata associated with each of the plurality of physical farm assets via a crop monitoring and analytics engine including a crop health, a crop produce quality, potential carbon sequestrated due to farming practices followed;

generating, a smart contract in the blockchain network defining a plurality of rules and conditions of ownership and one or more transactions associated with the plurality of NFTs for verifying and tracking the ownership, and the one or more transactions and the NFT wallet for the farmer;

receiving, a request for valuation of a set of NFTs selected by the farmer or the farmer representative from among the plurality NFTs for estimating Credit Eligibility (CE) of the farmer for a credit request initiated by the farmer or the farmer representative;

performing the valuation of the set of NFTs, by a farm asset valuation server, by fetching a reference valuation checklist and an associated price in a local currency from one or more external servers, wherein the farm asset valuation server is a node on the blockchain network and uses a country or region specific comparatively dynamic rate card database for various assets to bring parity among all stakeholders and among the farm assets of similar types based on associated characteristics of the farm asset;

validating, ownership of the set of NFTs that are registered in the farmer wallet available in the NFT wallet and exchange server, wherein when an ownership transfer request is received, then the NFT wallet and exchange server delinks an equal amount of full or fractional NFTs from a current owner wallet and links them with the new owner wallet, wherein when the ownership transfer request is for the fractional NFT, then the NFTs are fractionalized or divides main NFT tokens in the owner wallet in the required ratio mentioned in a transfer request message to generate sub-NFT tokens and are then delinked or linked from and to, current owner to new owner;

estimating, the CE of the farmer in accordance with the set of NFTs in the farmer wallet in terms of i) Credit Equivalent Value (CEV (cropland)) associated with at least one cropland based physical farm asset within the set of NFTs, and ii) one or more physical farm asset other than the cropland (CEV (non-cropland)), wherein estimating the CEV (cropland) considers static and dynamic components associated with the cropland, wherein a static value is decided based on historical information associated with the cropland in terms of crops cultivated, temporal soil health, yield obtained in each of past seasons, revenue generated and sustainability parameters and the static value is updated every season as each season add crops and associated attributes to update the static value every season, and wherein a dynamic value associated with the cropland changes over time due to factors including proximity to market, location of land; and issuing, a sanction of a loan amount from a lending entity for the credit request in accordance with the estimated CE to initiate a credit disbursal via a dynamic disbursement schedule comprising an initial disbursement schedule based on a current status of the set of the digital farm assets that is dynamically altered based on real time data, wherein full or fraction of the NFTs among the set of NFTs to be transferred from the farmer wallet to a loan wallet are proportionate to the amount of the credit disbursal and associated processing charges, service charges or taxes, wherein the dynamic disbursement schedule is based on personalized or customized parameters associated with the current status of a farm and the set of the digital farm assets linked to a credit collateral, wherein the dynamic disbursement schedule comprising:

generating the initial disbursement schedule based on the current status of the set of the digital farm assets derived from real-time data associated with at least one crop planned by the farmer for the at least one cropland, soil quality of the at least one cropland, forecasted weather in geography of the at least one cropland and personalized package of practices generated for the farmer, wherein the real time data is sourced from at least one of on-field sensors, satellite data and external data sources; and dynamically altering the initial disbursement schedule in accordance with the real time data based on one of:

real-time prediction or detection of events or change in state of the crop occurred post generating the initial disbursement schedule, wherein the events or change in state of the crop is determined based on the real time data; and a real time request supported by an event information from the farmer or the farmer representative for an additional credit disbursal, wherein the event information is validated based on the real time data or supported by authorized field survey, wherein for the mortgaged NFTs, a separate mortgage or collateral digital loan wallet or read-only wallet is created and an equivalent amount of the NFTs is moved to the mortgage or collateral digital loan wallet or the read-only wallet from the farmer wallet, wherein while the NFTs are in the mortgage or collateral digital loan wallet or the read-only wallet, ownership of the NFTs remains with the farmer and the NFTs are excluded from digital transactions until a lien on the NFTs is released, wherein when the physical farm assets are moved to a new owner due to inheritance or succession or auction, then an NFT Mortgage Node lending entity provides electronic consent to a farm asset valuation server with required information of the earlier loan transaction and the loan wallet is updated with the details of the new owner;

generating an amortization chart highlighting an Equal Monthly Installment (EMI), loan principle, interest rate, number of NFTs or fraction of the NFTs which remain mortgaged in a bank locker, based on the dynamic disbursement schedule;

digitally signing a contract and the bank sending a request to a financial transaction server and the NFT wallet and exchange server, and the farmer NFTs are fractionalized and lien fractional quantity is added in the loan wallet for the duration of the loan and with repayment of the loan amount, the NFTs are fractioned further and are returned from the loan wallet to the farmer wallet;

monitoring in real-time, via the on field sensors, satellite data and external information corresponding to weather, the cropland to check and predict calamities, losses due to pest or diseases and upon predicting the calamities, losses due to pest or diseases, providing access to an equivalent credit to the farmer and the dynamic disbursement schedule is updated as a season progresses; and validating a request by the farmer for additional credit at any point during a growing season using sourced current status of the cropland and access to the equivalent credit is provided to the farmer based on the request and associated reason.

15. The one or more non-transitory machine-readable information storage mediums of claim 14, wherein the full or the fraction of the NFTs among the set of NFTs are transferred back from the loan wallet to the farmer wallet in accordance with a full or partial repayment of the credit in accordance with the smart contract.

16. The one or more non-transitory machine-readable information storage mediums of claim 14, wherein the one or more physical farm asset other than the cropland (CEV (non-cropland)) comprise livestock, a well, a tractor, and one or more farm implements and, wherein the farmer or the farmer representative raises the credit request i) before start of a crop season of the at least one crop planned by the farmer for the at least one cropland or ii) during the crop season.

17. The one or more non-transitory machine-readable information storage mediums of claim 14, wherein each of the plurality of NFTs is associated with a metadata block comprising a NFT creation date, ownership, attributes describing unique properties of the NFT, geo-locational and temporal attributes associated with the NFT, and wherein the metadata block associated with the NFT is used to track the one or more transactions and a ownership history of the digital farm asset, bringing an additional layer of transparency in the transactions.

18. The one or more non-transitory machine-readable information storage mediums of claim 14, wherein the one or more transactions comprise a full or partial transfer of the plurality of NFTs i) between the farmer and the farmer representative for processing fees, and ii) between the farmer and the lending entity or a mortgaging entity depending upon the financial value for credit availed against the credit collateral and processing charges or applicable taxation of the credit request.

* * * * *